United States Patent [19]

Miller-Thomson et al.

[11] Patent Number: 4,546,490

[45] Date of Patent: Oct. 8, 1985

[54] SINGLE FREQUENCY DETECTION CIRCUIT

[75] Inventors: James J. Miller-Thomson, Beaconsfield; Gilles Dupuis, Brossard, both of Canada

[73] Assignee: Northern Telecom Limited, Montreal, Canada

[21] Appl. No.: 592,450

[22] Filed: Mar. 22, 1984

[51] Int. Cl.[4] ............................................. H04R 29/00
[52] U.S. Cl. .................................... 381/56; 324/78 D; 324/78 F; 328/138; 328/140; 307/522
[58] Field of Search ................ 324/78 D, 78 F, 79 D; 328/138, 140, 141; 307/522, 523, 524; 179/84 VF, 170.2; 381/56, 110, 58

[56] References Cited

U.S. PATENT DOCUMENTS

| 3,988,683 | 10/1976 | Bohme et al. | 328/138 |
| 4,042,790 | 8/1977 | Richards | 179/84 VF |
| 4,326,261 | 4/1982 | Peoples | 179/84 VF |
| 4,355,406 | 10/1982 | Guidoux | 179/170.2 |

Primary Examiner—Forester W. Isen
Attorney, Agent, or Firm—John E. Mowle

[57] ABSTRACT

A single frequency tone detection circuit for detecting a signalling tone in the presence of guard (i.e. voice) signals on a telephone line. The circuit utilizes a unique arrangement for separating the tone and voice signals by first rectifying and then filtering the incoming signal to eliminate any fundamental component of the signalling tone. The signals are then separated by low and high-pass filters into d-c and a-c components and after further processing their magnitudes are compared to ascertain whether or not a valid signalling tone is present.

3 Claims, 1 Drawing Figure

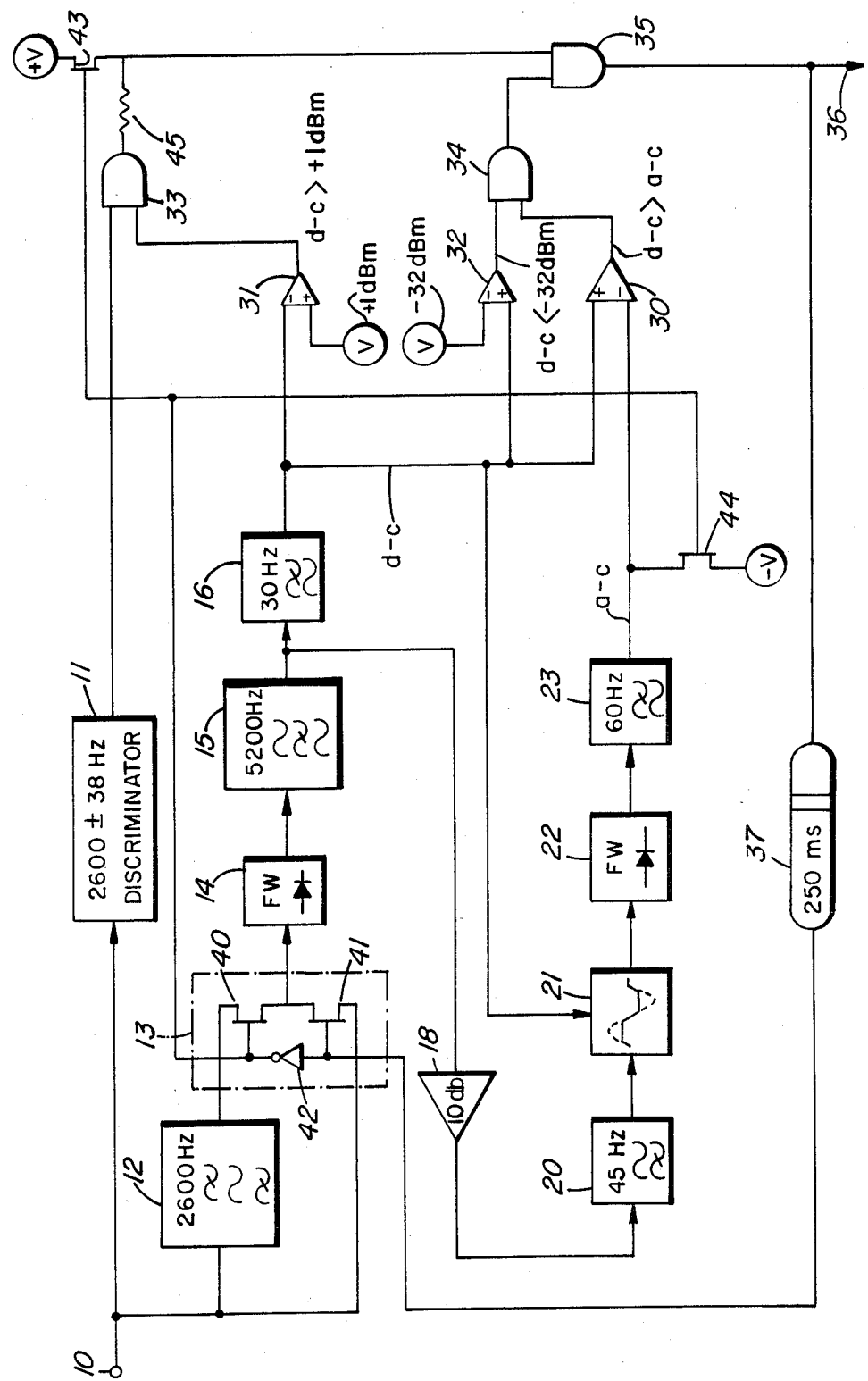

SINGLE FREQUENCY DETECTION CIRCUIT

This invention relates to a single frequency tone detection circuit and more particularly to one which provides the ability to readily differentiate between "voice" and "tone" signals while utilizing relatively inexpensive components.

BACKGROUND OF THE INVENTION

Single frequency (SF) in-band signalling systems are widely utilized in telephone equipment to pass address, supervisory, and alerting signals for telephone trunks or lines over 4-wire voice frequency transmission facilities without impairing their normal use for voice signals. An SF tone detection circuit is required at each end of the system to detect the normal standard signalling tone of 2600 Hz in the presence of voice and other signals being transmitted on the transmission facility.

Prior tone detection circuits utilized a combination of pass-band and stop-band filters with a moderately high Q to separate the tone signal frequencies from those of the guard signal frequencies (i.e. those which are present in the balance of the voice frequency spectrum). A general requirement is that the magnitude of the tone signals be 10 dB greater than that of the guard signals. However this 10 dB differential becomes severely distorted as the guard signals approach 2600 Hz, due to the rolloff characteristics of the filters. For example, when the guard signal is 100 Hz away from 2600 Hz, the guard signal is attenuated approximately 10 dB. As a result the detector indicates the presence of a valid SF tone when the two signals are of approximately equal magnitude.

Such prior tone detection circuits generally utilized resistance-inductance-capacitance components in the filters with individual tunning of the critical components. Even utilizing capacitors with temperature coefficients which would compensate for those of the inductors, it has been found difficult to maintain the accuracy of the center frequency to within the required tolerance of 0.3% over the short term and virtually impossible to maintain this accuracy over a long term period.

STATEMENT OF THE INVENTION

The present invention overcomes this problem by providing a unique arrangement for separating the tone and guard signals. After prefiltering, the incoming signal is first rectified and filtered to eliminate any fundamental frequency component of the signalling tone, then separated by low and high-pass filters into substantially d-c and a-c frquency components. Since the magnitude of the tone signal remains substantially constant, it presents a substantially d-c component at the output of the low-pass filter. Conversely, the voice signals present a relatively high frequency a-c signal component which, after further processing, can then be compared against the d-c component to determine the valid presence of the SF signalling tone.

Thus, in accordance with the present invention there is provided a single frequency tone detection circuit, for detecting the presence of a signalling tone having upper and lower magnitude limits in the presence of other (e.g. voice) signals, which comprises a discriminator for detecting the presence of signals having a frequency component nominally the same as the signalling tone and a band-pass filter for passing said signalling tones. The tone detection circuit is characterized by a rectifier for rectifying the signals from the output of the band-pass filter and a low-pass filter responsive to the output of the rectifier for passing substantially all signals having frequency components below the fundamental frequency component of the rectified signalling tone. The tone detection circuit is also characterized by a comparison means for indicating when the ratio of the d-c to a-c components of the signal at the output of the low-pass filter is greater than a predetermined amount, as well as a comparison means for indicating when the d-c component is between the upper and lower magnitude limits. The circuit is also characterized by a gating means that is responsive to the discriminator means and the first and second comparison means for indicating the presence of a valid signalling tone.

BRIEF DESCRIPTION OF THE DRAWING

An example embodiment of the invention will now be described with reference to the accompanying drawing which illustrates a block and schematic circuit diagram of a signal frequency tone detection circuit.

DESCRIPTION OF THE PREFERRED EMBODIMENT

The single frequency tone detection circuit shown in the figure is designed to detect a standard $2600 \pm 38$ Hz signalling frequency having a received signal level between $-32$ dBm and $+1$ dBm in the presence of other signals having an RMS magnitude 10 dB lower than that of the signalling tone. The incoming signal from a telephone trunk or line (not shown) is connected from the input 10 of the circuit to a frequency discriminator 11, the output of which goes high whenever a signal having a frequency component of $2600 \pm 38$ Hz is detected. A digital discriminator which counts zero crossings over a preselected interval of time is one preferred form which can be used to provide this function. The incoming signal at the input 10 is also coupled to a 2600 Hz band-pass filter 12 having a Q=6, the output of which is coupled through an analog switch 13 to a full-wave rectifier 14. The output of the rectifier 14 is filtered by an elliptical notch filter 15 which acts as a cascaded low-pass filter with a pole at 3000 Hz, and a notch filter (having about a 40 dB loss) with a zero at 5200 Hz. The purpose of this filter is to eliminate the high frequency components of the rectified signal and in particular the fundamental frequency component of the signalling tone which is frequency doubled to 5200 Hz by the full-wave rectifier 14.

The output of the notch filter 15 is coupled through a low-pass filter 16 having a cut-off frequency of 30 Hz. Due to the notch characteristics of filter 15 and the low-pass characteristics of filter 16, the output of the latter is a very steady d-c signal having a magnitude which is directly proportional to the magnitude of the 2600 Hz signal at the input 10 to the tone detection circuit. Concurrently, the output of the filter 15 is coupled through an amplifier 18, the purpose of which is to compensate for a 10 dB differential (the minimum allowable differential for detection of a valid signal) between the signalling tone and the guard signal as well as any other relative losses encountered during signal processing. The signal then passes to the input of a high-pass filter 20 having a cut-off frequency of 45 Hz. Due to the combined use of the full-wave rectifier 14 and notch filter 15, the a-c output signal from this high-pass filter 20 is substantially proportional to the balance of the voice frequency spectrum. The output from the filter 20 is coupled through a signal clamp 21 which limits the level of the a-c signal to about the same magnitude as that of the d-c signal at the output of the low-pass filter 16. The purpose of this clamp 21 is to suppress the a-c signal whenever the d-c signal (which is proportional to the 2600 Hz signalling tone) disappears. This improves the response time and reduces variations with signal level of the tone detection circuit.

The output signal from the clamp 21 is again rectified in full-wave rectifier 22 and then passed through a low-pass filter 23 having a cut-off frequency of 60 Hz. The rectified and filtered output signal is a substantially d-c signal which is proportional to the balance of the voice frequency spectrum. To distinguish between the two d-c signals at the output of the filters 16 and 23, the one from filter 23 will continue to be referred to as an a-c signal. The d-c signal representing the magnitude of the 2600 Hz signalling tone, and the a-c signal representing the balance of the voice frequency spectrum, are now compared in a differential amplifier 30, the output of which goes high whenever the d-c signal is greater in magnitude. This represents a 10 dB difference in level between the two signals due to the compensation of the amplifier 18.

Concurrently, the d-c signal is compared in a second differential amplifier 31 against a d-c voltage representing a +1 dBm reference signal so that the output goes high whenever the magnitude of the d-c signal is less than the reference signal. Concurrently, the d-c signal is compared against a second d-c voltage representing a −32 dBm reference signal in a third differential amplifier 32, the output of which goes high whenever the d-c signal is greater than this reference level. The outputs of these two differential amplifiers 31 and 32 set the upper and lower magnitude limits for the 2600 Hz signal. The output of the discriminator 11 and the voltage comparator 31 are connected to the inputs of an AND gate 33 while the outputs of the voltage comparators 30 and 32 are connected to an AND gate 34. When all conditions are met (i.e. a 2600 Hz signal component is detected, the rectified 2600 Hz signal is 10 dB greater than the rectified voice spectrum, and the magnitude of the rectified 2600 Hz is between −32 dBm and +1 dBm), the outputs of both AND gates 33 and 34 go high and these in turn cause the output of an AND gate 35 to go high which indicates a valid detected signalling tone at the output 36 of the detection circuit.

It is a requirement of such tone detection circuits that the requirements for indicating the continued presence of the 2600 Hz signal be relaxed once the initial detection of the tone has been established. To achieve this, the output 36 of the detection circuit is coupled through a 250 ms delay circuit 37 to control the input of the analog switch 13. The switch 13 comprises two field-effect transistors 40 and 41 and an inverter 42 and is arranged so that either the output of the band-pass filter 12 or the input of the tone detection circuit 10 is connected directly to the full-wave rectifier 14. Once detection of the signalling tone is established, the band-pass filter 12 is bypassed by the analog switch 13. The output of the inverter 42 also controls field-effect transistors 43 and 44. Transistor 43 bypasses the output of AND gate 33 which was coupled to the input of AND gate 35 through the resistor 45. Transistor 44 bypasses the output of the filter 23. Under these conditions the only test which must be met in the tone detection circuit to indicate a valid signalling tone is that the 2600 Hz signal must have a magnitude > −32 dBm.

The tone detection circuit, by demodulating the incoming voice frequency signal, separates the signalling tone and the guard signals by a 30 Hz low-pass filter 16 and 45 Hz high-pass filter 20 so that the circuit will accurately distinguish tone and guard signals even when they are only 100 Hz apart. Such a circuit eliminates the requirement for high precision and costly capacitors which were used to assure both accuracy and stability of earlier detection circuits. Utilizing the demodulation technique, the low-pass filter 16 readily differentiates signalling frequencies from guard frequencies and can have a wide tolerance since a fairly large percentage change in the low-pass characteristics has relatively little effect on the overall performance of the detection circuit.

What is claimed is:

1. A single frequency tone detection circuit for detecting the presence of a signalling tone having upper and lower magnitude limits, in the presence of other signals, comprising:

discriminator means for detecting the presence of signals having a frequency component substantially the same as the signalling tone;

a band-pass filter for passing said signalling tones;

a rectifier for rectifying signals from the output of the band-pass filter;

a low-pass filter responsive to the output of the rectifier for passing substantially all signals having frequency components below the fundamental frequency component of the rectified signalling tone;

first comparison means for indicating when the ratio of the d-c to a-c components of the signal at the output of the low-pass filter is greater than a predetermined amount;

second comparison means for indicating when said d-c component is between said upper and lower magnitude limits; and gating means responsive to the discriminator means and the first and second comparison means for indicating the presence of a valid signalling tone.

2. A single frequency tone detection circuit as defined in claim 1 in which the low-pass filter is a first low-pass filter; and the first comparison means includes:

a second low-pass filter for passing substantially only said d-c component of the signal, a high-pass filter for passing substantially all of said a-c component of the signal, second rectifier means for rectifying said a-c signals from the output of the high-pass filter;

a third low-pass filter for passing the low frequency components from the output of the second rectifier means to produce a d-c signal having a magnitude substantially proportional to that of said a-c component of the signal; and means for comparing the magnitude of said d-c signals from the outputs of the first and third low-pass filters.

3. A single frequency detection circuit as defined in claim 1 which includes means responsive to the indicated presence of said signalling tone for bypassing said discriminator means, said first comparison means, said band-pass filter, and said upper magnitude limit of said second comparison means.

* * * * *